United States Patent [19]
Clements

[11] 4,165,079
[45] Aug. 21, 1979

[54] FLUID SEAL RING

[75] Inventor: John A. Clements, The Hague, Netherlands

[73] Assignee: General Motors Corporation, Detroit, Mich.

[21] Appl. No.: 930,144

[22] Filed: Aug. 2, 1978

[51] Int. Cl.² .............................................. F16J 9/20
[52] U.S. Cl. ...................................... 277/9.5; 277/27
[58] Field of Search ................... 277/1, 9, 9.5, 11, 25, 277/26, 27, 213, 214, 215, 237 R

[56] References Cited

U.S. PATENT DOCUMENTS

| | | | |
|---|---|---|---|
| 3,588,125 | 6/1971 | Mastromatteo | 277/26 |
| 3,601,415 | 8/1971 | Bond | 277/9.5 |
| 3,897,072 | 7/1975 | Inka et al. | 277/215 |
| 4,126,317 | 11/1978 | Bainard | 277/9.5 |

*Primary Examiner*—Robert I. Smith
*Attorney, Agent, or Firm*—Donald F. Scherer

[57] ABSTRACT

A seal ring of resilient material is disposed in a groove to provide a seal in a clearance space between a stationary member and a rotating member. The seal ring is cold-formed to provide axial undulations, prior to assembly, so that the seal ring has a greater effective width than the groove width whereby, during assembly, the seal ring is placed in an interference fit within a groove in one member and is contained within the groove to facilitate the assembly of the members without damage to the seal ring. Initial operation of the members, with oil having a temperature above ambient, causes the seal ring to relax from the cold-formed configuration to permit the seal to move radially in the grooved member until sealing contact with the other member occurs thereby restricting leakage between the members.

2 Claims, 4 Drawing Figures

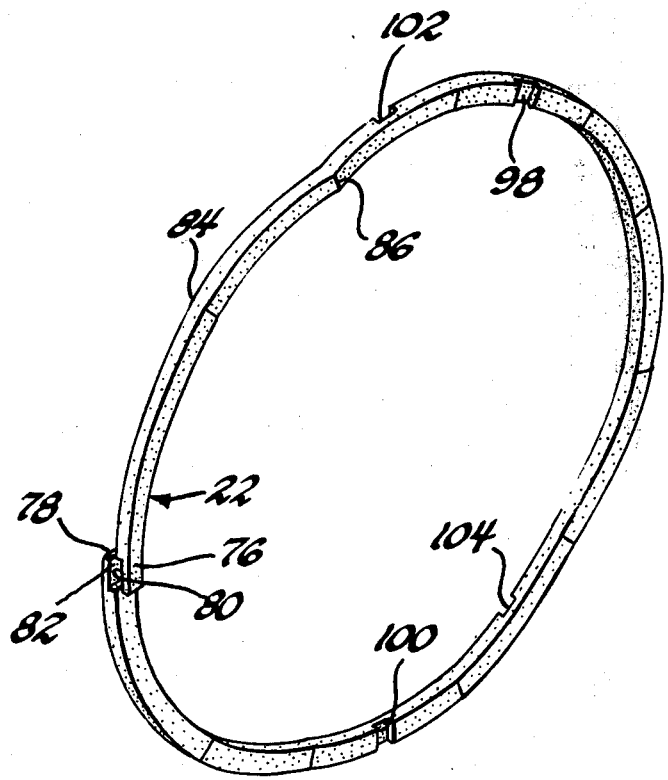

FLUID SEAL RING

This invention relates to fluid seals and more particularly to expandable fluid seals.

In accordance with the present invention, an improved polytetrafluoroethylene (PTFE) cut seal ring having undulations in an axial direction is provided. The undulated ring has a greater effective width at assembly than the width of the seal ring groove. The cut seal ring is manufactured in the conventional manner to made a straight seal ring. The seal ring is then cold-formed to provide the undulations. The cold-forming is preferably done at ambient temperature or a low temperature sufficiently less than the operating temperature of the seal application so that use of the seal at a higher temperature will cause the seal to flatten or straighten due to the memory characteristic of PTFE. The undulations are mild and preferably have a slight curvature at the peaks and valleys. In one embodiment, a seal having an actual width of about 0.090 inches and undulations having a dimension of 0.030 inches between the peaks and valleys was found effective with a groove having a width of 0.100 inches. This undulation dimension, it was found, may vary at least from 0.015 to 0.045 inches and still perform the desired function.

The overlap recesses of the cut seal ends are formed on the inside surface of end portions so there is an undulating portion that is quite flat and will engage the side walls of the groove. The facing sides of the recesses are parallel to each other at the end undulated portions to facilitate the seal ring in a narrower groove and accommodate partial straightening and prestressing the undulated seal ring in the groove. The recess is of sufficient length so there is always some minimal overlap and the ends do not abut during all assembly and operating conditions.

This seal ring is preferably used to provide a seal between a rotary member and a stationary support member. The support has an annular groove having a depth sufficient to receive the seal ring so the outside diameter of the seal ring is flush or slightly below the outside diameter of the cylindrical support surface. The groove has a width such that during assembly of the seal ring in the groove, the undulations are sufficiently straightened causing the ring to be prestressed to bear against the side walls of the groove with sufficient force to hold and retain the seal ring fully submerged in the groove to facilitate assembly of the rotary member on the support without damaging the seal. The groove in one example, as previously mentioned, had a width of 0.100 inches for a seal ring having an actual seal width of 0.090 inches and an effective undulated width of 0.120 inches.

During operation, oil under pressure and at an elevated temperature enters in one direction between the rotary member and the support. The oil will enter the groove and cause the ring to relax and expand to abut and seal on a surface of the rotary member. The normal oil operating tempertures are significantly higher, for example 400° F., than the cold-forming temperature, for example, ambient up to 100° F., so the memory characteristics of the PTFE seal ring straighten or flatten the ring to relieve the prestress and tend to cause the seal ring to expand. The oil, under pressure, acting on one side of the seal ring causes the undulations to be fully flattened so the ring is no longer prestressed and is held against one side of the groove.

It is therefore an object of this invention to provide an improved seal ring formed to have axial undulations which permit assembly in a seal groove to maintain the seal ring in a nonsealing condition during assembly.

It is another object of this invention to provide an improved seal ring assembly having cold-formed axial undulations establishing an effective seal width greater than the seal groove width so that an interference fit occurs therebetween to maintain the seal ring depressed in the groove during assembly and the flow of oil, heated to a temperature above ambient, induces relaxation of the cold-worked undulations causing the seal to extend radially partially out of the seal groove to accomplish the desired seal function.

These and other objects and advantages of the present invention will be more apparent in the following description and drawings in which.

Figure 1:
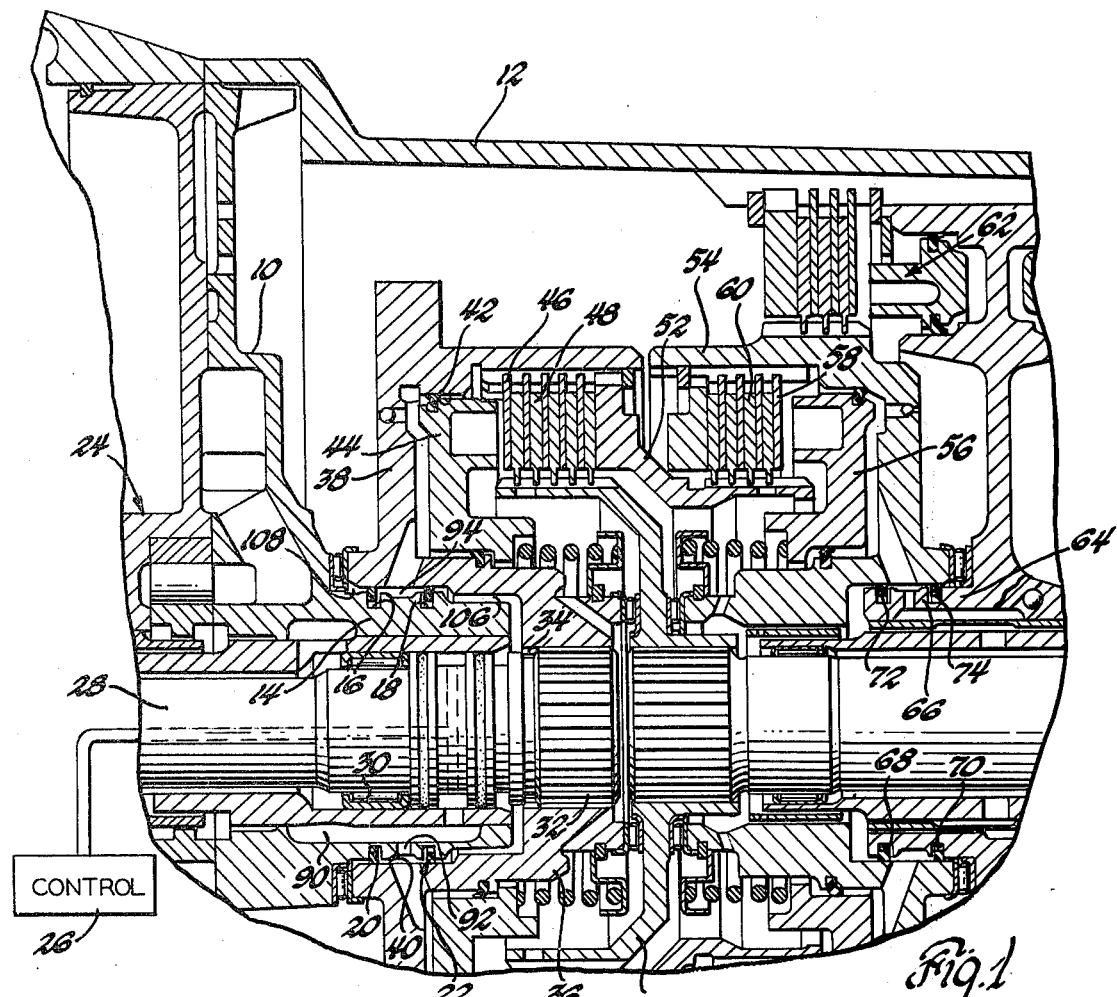
FIG. 1 is a sectional elevational view of a clutch support assembly having the seals constructed in accordance with the present invention.

Referring to the drawings, wherein the same characters represent the same or corresponding parts, there is shown in FIG. 1, a partial view of a transmission clutch assembly in which a stationary end wall 10 is supported in a transmission housing 12. The end wall 10 has an axially extending cylindrical hub portion 14 in which is formed a pair of grooves 16 and 18 having seal rings 20 and 22 disposed therein respectively. The end wall 10 also provides a portion of a conventional internal/external gear pump generally designated 24. The pump 24 supplies fluid to the control system, shown diagrammatically at 26 in a conventional manner. The control system 26, as is well-known, supplies fluid under pressure to the transmission to permit operation of the clutches and brakes therein and also to provide cooling and lubrication. An input shaft 28 is rotatably supported on a needle bearing 30 in the hub portion 14 and has formed on the end thereof a splined portion 32. The splined portion 32 mates with a spline 34 formed on a hub portion 36 of a clutch housing 38.

The clutch housing 38 has a cylindrical surface 40 which is supported on the end wall 10. As can be seen in FIG. 1, the surface 40 of the clutch housing 38 has a cylindrical surface which is abutted by the seal rings 20 and 22. The clutch housing 38 has formed therein a recess 42 in which is slidably disposed a piston 44. The piston 44 is adapted to be pressurized in a conventional manner which will cause the piston 44 to be moved axially to enforce engagement between interleaved friction plates 46 and 48 which are splined to the clutch housing 38 and a clutch output hub 50, respectively. The clutch, when engaged, will operate in a conventional manner and a description of such operation is not considered necessary at this point. Also splined to the clutch housing 38 is a hub 52 which extends into a second clutch housing 54 in which is slidably disposed a piston 56. The piston 56 is adapted to be pressurized in a conventional manner to cause frictional engagement between interleaved friction plates 58 and 60 which are splined to the clutch housing 54 and hub 52, respectively. This second set of clutch plates and clutch pistons will operate in a conventional manner as the first described clutch does. A conventional disc-type friction brake generally designated 62, is shown disposed between the clutch housing 54 and the transmission housing 12 to provide a braking function for the transmission. Those familiar with the transmission art will be familiar with the operating of such disc-type brakes and further explanation of the brake is not considered necessary at this point.

The clutch housing 54 is rotatably supported on a cylindrical axial extension 66 of a stationary wall 64 which is secured to the transmission housing 12 in a manner similar to the clutch housing 38. The axial extension 66 has formed therein a pair of seal grooves 68 and 70 in which are disposed seals 72 and 74, respectively. The seals 72 and 74 are similar in construction to the seals 20 and 22 such that discussion of seals 20 and 22 will also apply to the seals 72 and 74.

Figure 2:
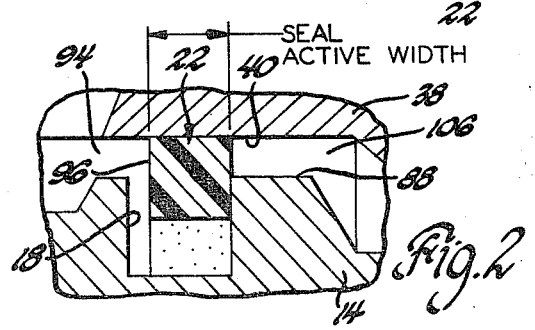
FIG. 2 is an enlarged view of a portion of FIG. 1.
Figure 4:
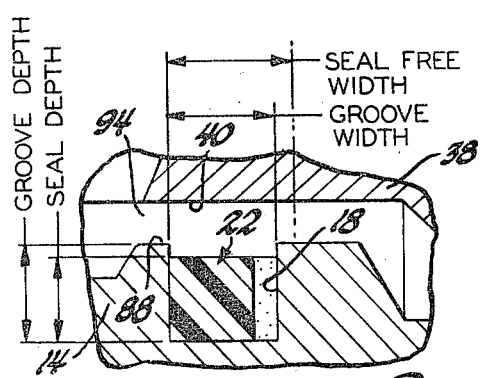
FIG. 4 is a view similar to FIG. 2 showing the seal in the at assembly position in the groove.
Figure 3:
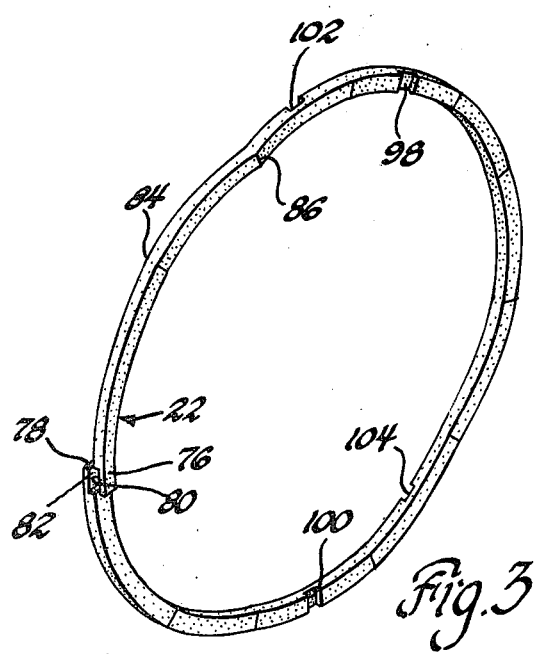
FIG. 3 is an isometric view of a seal incorporating the present invention.

As seen in FIG. 3, the seal designated as 22 is generally a ring-shaped member and has a pair of ends 76 and 78 in which are formed complementary recess portions 80 and 82, respectively. The seal ring 22 has a plurality of undulations formed therein, such as 84 and 86, which cause the effective width of the seal 22 to be greater than the actual width. The actual width of the seal ring can be seen in FIG. 2. The effective seal width is from the peak at 86 on the righthand side of seal 22 to the peak at 84 on the lefthand side of seal 22. The effective width from undulation 84 to undulation 86 is greater than the width of the groove 18, and as can be seen in FIG. 4, the ring 22 is held in the groove 18 below the outer cylindrical surface of the hub portion 14. FIG. 4 is a representation of the seal 22 at assembly. FIG. 2 is a representation of the seal 22 during operation after assembly. As can be seen in both FIGS. 2 and 4, the depth of groove 18 is greater than the height of seal 22, such that during assembly, the seal 22 can be maintained in a position below the surface 88 so that insertion of the housing 38 over the support hub 14 will not cause the seals to be cut.

During operation, fluid pressure is supplied from the control 26 to a recess 90, from which the fluid is transmitted through an aperture 92 to a clearance space 94 between the seals 20 and 22. Fluid in the space 94 is at a temperature above the cold-worked temperature of the seals 20 and 22 and therefore causes the seal to relax, due to the memory characteristic of PTFE, such that the seal will expand from the position shown in FIG. 4 to the position shown in FIG. 2. Also during expansion of the seal, the fluid flowing over the top of seal 22 is at a lesser pressure, due to the fluid velocity, than the pressure of fluid beneath the seal 22. This pressure unbalance also induces outward movement of the seal. When the seal 22 contacts the surface 40, the fluid pressure in space 94 will act against the face 96 of seal 22 to cause the seal to be further flattened and held in a sealing position. The ends 76 and 78 of seal ring 22 are designed such that they will never abut the end of recesses 80 and 82 during any condition of operation either at assembly as shown in FIG. 4, or during operation as shown in FIG. 2.

As can be seen in FIG. 3, the seal ring 22 has two radially extending grooves 98 and 100 formed on the righthand side of the ring and two radially extending grooves 102 and 104 formed on the lefthand side of the ring. These grooves are very shallow and permit a flow of fluid from space 94 to space 106 or 108 to provide for cooling and lubrication flow to various transmission components. The control of the size of these radial slots controls the amount of fluid flow which will be permitted to bypass the seal structure to effect the desired cooling and lubrication. While the above description has been directed toward seal 22, the same description applies for seals 20, 72 and 74.

During assembly, the ends 76 and 78 of the seal 22 will be abutting opposite sides of the groove 18 and since the ends are overlapped, the leakage therethrough is by way of a very tortuous path which does not affect the pressure buildup. After the seal has been fully extended, as shown in FIG. 2, and fluid pressure increases, the parallel forces of recesses 80 and 82 will be in an abutting relationship and there will be no fluid flow therebetween.

Obviously, many modifications and variations of the present invention are possible in light of the above teaching. It is therefore to be understood, that within the scope of the appended claims the invention may be practiced otherwise than as specifically described.

The embodiments of the invention in which an exclusive property or priviledge is claimed are defined as follows:

1. A seal assembly responsive to heated pressurized fluid: a first member having an outer cylindrical surface; a second member having an internal cylindrical surface; means to support said members for relative rotation with said cylindrical surfaces in concentric relation with a small clearance space between said surfaces; an annular groove in one of said members having an annular base located a predetermined groove depth substantially larger than said clearance space from the surface of said one of said members and parallel annular side walls spaced apart a predetermined groove width; a split annular seal ring made of flexible resilient material having an inner diameter annular surface and an outer diameter annular surface radially spaced apart a cross section height slightly less than said groove depth and side annular faces axially spaced apart a cross section width substantially less than said groove width and being axially undulated to provide undulations on said side annular faces having a total undulated free width sufficiently larger than said groove width so that on placing said seal ring in said groove said seal ring is partially flattened and prestressed with said undulated side faces engaging said side walls to hold said seal ring with one annular surface flush or slightly submerged in said groove and the other annular surface adjacent said base for assembly of one member into the other member without damaging said seal ring; said seal ring being responsive to the flow of heated fluid in said clearance space past said groove and seal ring to enter said groove between the undulations of said seal ring to flatten said seal ring and move said seal ring partially out of said groove and hold said one annular surface in sealing contact with the cylindrical surface on the other of said members.

2. A seal assembly responsive to heated pressurized fluid: a stationary member having an outer cylindrical surface; a rotary member having an internal cylindrical surface and being supported on said stationary member for relative rotation therewith and said cylindrical surfaces being in concentric relation with a small clearance space between said surfaces; a pair of annular grooves in said stationary member each having an annular base located a predetermined groove depth substantially larger than said clearance space from the surface of said stationary member and parallel annular side walls spaced apart a predetermined groove width; a pair of split annular seal rings made of flexible resilient material each disposed in respective annular grooves and each having an inner diameter annular surface and an outer diameter annular surface radially spaced apart a cross section height slightly less than said respective groove depth and side annular faces axially spaced apart a cross section width substantially less than said respective groove width and being axially undulated to provide undulations on said side annular faces having a total undulated free width sufficiently larger than said respective groove width so that on placing each of said seal rings in said respective grooves said seal rings are partially flattened and prestressed with said undulated side faces engaging said side walls to hold said seal rings with said outer annular surface flush or slightly submerged in said respective groove and said inner annular surface adjacent said base of said respective groove for assembly of said rotary member onto said stationary member without damaging said seal rings; said seal rings being responsive to the flow of heated fluid in said clearance space past said respective grooves and seal rings to enter said grooves between the undulations of said respective seal rings to flatten said seal rings and move said seal rings partially out of said respective groove and hold said outer annular surface in sealing contact with the cylindrical surface on said rotary member.

* * * * *